US009243432B2

(12) United States Patent
Lee

(10) Patent No.: US 9,243,432 B2
(45) Date of Patent: Jan. 26, 2016

(54) ELECTRONIC APPARATUS HAVING HINGE ASSEMBLIES WITH COVER UNITS

(71) Applicant: Samsung Electronics Co., Ltd, Suwon-si, Gyeonggi-do (KR)

(72) Inventor: Myoung-ku Lee, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/470,130

(22) Filed: Aug. 27, 2014

(65) Prior Publication Data

US 2015/0176317 A1    Jun. 25, 2015

(30) Foreign Application Priority Data

Dec. 23, 2013    (KR) .................. 10-2013-0161075

(51) Int. Cl.
| | |
|---|---|
| *E05D 11/00* | (2006.01) |
| *E05D 5/10* | (2006.01) |
| *G06F 1/16* | (2006.01) |
| *E05D 3/06* | (2006.01) |

(52) U.S. Cl.
CPC .. *E05D 5/10* (2013.01); *E05D 3/06* (2013.01); *G06F 1/1681* (2013.01)

(58) Field of Classification Search
CPC ............... E05D 3/122; E05D 11/0054; E05D 2011/0045; E05D 2011/0072; E05D 5/10; E05D 3/06; E05D 11/00
USPC .................................. 16/250, 354, 355, 386
See application file for complete search history.

(56) References Cited

U.S. PATENT DOCUMENTS

| | | | | | |
|---|---|---|---|---|---|
| 1,167,906 | A | * | 1/1916 | Le Compte ..................... 296/92 |
| 2,206,739 | A | * | 7/1940 | Brogren et al. ................ 16/354 |
| 4,056,985 | A | * | 11/1977 | Worrallo ........................ 74/435 |
| 4,765,027 | A | * | 8/1988 | Andric ............................ 16/354 |
| 5,966,777 | A | * | 10/1999 | Jantschek ...................... 16/354 |
| 5,987,704 | A | * | 11/1999 | Tang .............................. 16/354 |
| 5,991,975 | A | * | 11/1999 | Baer .............................. 16/354 |
| 6,223,393 | B1 | | 5/2001 | Knopf | |

(Continued)

FOREIGN PATENT DOCUMENTS

| | | |
|---|---|---|
| JP | 2008-228249 | 9/2008 |
| JP | 2009-225193 | 10/2009 |

(Continued)

OTHER PUBLICATIONS

Extended European Search Report mailed May 20, 2015 in corresponding European Application No. 14179005.5-1959.

*Primary Examiner* — Roberto Delisle
(74) *Attorney, Agent, or Firm* — Staas & Halsey LLP

(57) ABSTRACT

An electronic apparatus includes first and second device units, at least one hinge assembly configured to pivotally connect the second device unit to the first device unit and including a plurality of shaft members, and a plurality of cover units mounted on the at least one hinge assembly to hide the at least one hinge assembly. Each of the cover units includes a first cover member to hide a first side of the at least one hinge assembly and a second cover member to hide a second side of the at least one hinge assembly, a second cover member of each of the cover units is partially overlapped with an adjacent second cover member while the first and second device unit are folded, and a relative position of second cover members is changed according to an angle at which the first and second device units are unfolded.

19 Claims, 21 Drawing Sheets

(56) References Cited

U.S. PATENT DOCUMENTS

| | | | |
|---|---|---|---|
| 6,519,812 B2* | 2/2003 | Ko et al. | 16/354 |
| 7,082,196 B2 | 7/2006 | Kauhaniemi et al. | |
| 7,345,872 B2* | 3/2008 | Wang | 361/679.55 |
| 7,532,916 B2 | 5/2009 | Lee et al. | |
| 7,593,524 B2 | 9/2009 | Maenpaa | |
| 7,805,810 B2* | 10/2010 | Hoffman | 16/354 |
| 7,832,056 B2* | 11/2010 | Kuwajima et al. | 16/354 |
| 8,170,630 B2 | 5/2012 | Murayama et al. | |
| 8,254,103 B2 | 8/2012 | Park et al. | |
| 8,438,702 B2 | 5/2013 | Apgar et al. | |
| 8,474,101 B2* | 7/2013 | Wang et al. | 16/366 |
| 8,720,011 B1 | 5/2014 | Hsu et al. | |
| 8,869,352 B2 | 10/2014 | Hsu et al. | |
| 2005/0155182 A1 | 7/2005 | Han et al. | |
| 2007/0117600 A1 | 5/2007 | Robertson, Jr. et al. | |
| 2007/0226955 A1* | 10/2007 | Cho et al. | 16/354 |
| 2009/0070961 A1* | 3/2009 | Chung et al. | 16/354 |
| 2010/0232100 A1 | 9/2010 | Fukuma | |
| 2011/0000136 A1* | 1/2011 | Brun | 49/358 |
| 2011/0271486 A1* | 11/2011 | Wang et al. | 16/319 |
| 2012/0264489 A1 | 10/2012 | Choi et al. | |
| 2014/0174226 A1 | 6/2014 | Hsu et al. | |

FOREIGN PATENT DOCUMENTS

| | | |
|---|---|---|
| KR | 10-2011-0039870 | 4/2011 |
| KR | 10-2011-0100936 | 9/2011 |
| KR | 10-2012-0117140 | 10/2012 |
| TW | 453 753 | 5/2013 |
| TW | 453 754 | 5/2013 |

* cited by examiner

ELECTRONIC APPARATUS HAVING HINGE ASSEMBLIES WITH COVER UNITS

CROSS-REFERENCE TO RELATED APPLICATIONS

This application claims the benefit of priority under 35 U.S.C. §119(a) to Korean Patent Application No. 10-2013-0161075, filed on Dec. 23, 2013, in the Korean Intellectual Property Office, the content of which is incorporated herein in its entirety by reference.

BACKGROUND OF THE INVENTION

1. Field of the Invention

Embodiments of the inventive concept relate to cover units of hinge assemblies of an electronic apparatus, and more particularly to an electronic apparatus that is composed of a main body portion and a display portion, such as, for example, a laptop computer.

2. Description of the Related Art

In general, in the case of an electronic apparatus that is composed of a main body portion and a display portion, such as, for example, a laptop computer, the display portion may be pivotally mounted on the main body portion to be arranged at various angles with respect to the main body portion.

In such an electronic apparatus, the display portion may be pivotally connected to the main body portion through at least one hinge assembly. In this case, a gap space may be formed between the display portion and the main body portion in order to install the at least one hinge assembly. In order to hide such a gap space, a plurality of cover units arranged in a line may be provided for the electronic apparatus.

The plurality of cover units may have an arrangement that is changed depending on a pivot angle of the display portion. From a viewpoint of esthetic design, it may be preferable that gaps between the plurality of cover units are not visible regardless of the pivot angle of the display portion.

SUMMARY OF THE INVENTION

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an electronic apparatus including first and second device units, at least one hinge assembly configured to pivotally connect the second device unit to the first device unit and including a plurality of shaft members, and a plurality of cover units mounted on the at least one hinge assembly to hide the at least one hinge assembly, wherein each of the cover units includes a first cover member to hide a first side of the at least one hinge assembly and a second cover member to hide a second side of the at least one hinge assembly, and a second cover member of each of the cover units is partially overlapped with an adjacent second cover member while the first and second device unit are folded, and a relative position of second cover members is changed according to an angle at which the first and second device units are unfolded.

the plurality of shaft members may be changed in their arrangements according to an angle of rotation between the first and second device units.

The second cover member comprises a main cover surface and a auxiliary cover surface formed extending from the main cover surface.

The auxiliary cover surface may have the hidden arrangement when the shaft members are arranged along a plane surface and may have the exposed arrangement when the shaft members are arranged along a curved surface.

The shaft members may be arranged along the plane surface when the electronic apparatus is in a folded state and may be arranged along the curved surface when the electronic apparatus is in an unfolded state.

When the auxiliary cover surface has the exposed arrangement, a gap between two of the cover units may be hidden by the main cover surface.

When the auxiliary cover surface has the exposed arrangement, a gap space between two of the main cover surfaces may be hidden by the auxiliary cover surface.

Each of the cover units may further include a shaft connection member connected to at least one corresponding shaft member of the plurality of shaft members, the first cover member coupled to the shaft connection member so as to be arranged on an upper side of the shaft connection member, and the second cover member coupled to the shaft connection member so as to be arranged on a lower side of the shaft connection member.

The second cover member may include a main cover portion, and an auxiliary cover portion formed extending from the main cover portion.

The main cover portion and the auxiliary cover portion may form a shape of a step.

A distance between the shaft members and the main cover portion may be longer than a distance between the shaft members and the auxiliary cover portion.

The electronic apparatus may further include a gear unit mounted on the shaft members to connect the plurality of shaft members through gear engagement.

The gear unit may include a first gear train and a second gear train arranged in parallel with each other, and each of the first and second gear trains may include a plurality of gear members connected in series to each other.

Each of the first and second gear trains may include at least one coupling gear member configured to constantly maintain a gap between the plurality of shaft members.

The electronic apparatus may further include a plurality of coupler members configured to constantly maintain a gap between the plurality of shaft members.

The at least one hinge assembly may include two hinge assemblies having the same structure.

The first device unit may be a main body portion of the electronic apparatus and the second device unit may be a display portion of the electronic apparatus, the display portion having a display screen.

The foregoing and/or other features and utilities of the present inventive concept also provide an electronic apparatus including a first device unit and a second device unit, a hinge assembly configured to rotatably connect the second device unit to the first device unit and including a plurality of shaft members, and a plurality of cover units mounted on the hinge assembly to cover the hinge assembly. Each of the cover units may include a cover surface to hide a side of the hinge assembly. The cover surface may include an auxiliary cover surface having one of a hidden arrangement and an exposed arrangement according to an angle of rotation between the first and second device units.

The foregoing and/or other features and utilities of the present inventive concept also provide an apparatus including a hinge assembly including a plurality of shaft members and a plurality of cover units mounted on the hinge assembly to cover the hinge assembly. Each of the cover units may include a cover surface to hide a side of the hinge assembly. The cover surface may include an auxiliary cover surface having one of a hidden arrangement and an exposed arrangement according to arrangement states of the shaft members.

The foregoing and/or other features and utilities of the present inventive concept also provide an apparatus including a hinge having a first shaft between first and second portions of the apparatus, a second shaft between the first shaft and the second portion, and configured to connect the first and second portions, and a cover mounted on the hinge and configured to hide the hinge regardless of an angle formed between the first and second portions.

The cover may include a first cover member configured to hide a first side of the hinge and a second cover member configured to hide a second side of the hinge regardless of the angle formed between the first and second portions.

The second cover member may include a first cover surface configured to continuously hide the second side of the hinge and a second cover surface configured to hide the second side of the hinge when the hinge is arranged along a curve.

The foregoing and/or other features and utilities of the present inventive concept also provide an electronic apparatus including a first device unit and a second device unit, a hinge assembly configured to rotatably connect the second device unit to the first device unit and including a plurality of shaft members, and a plurality of cover units mounted on the hinge assembly to cover the hinge assembly. Each of the cover units may include a cover surface to hide a side of the hinge assembly. The cover surface may include an auxiliary cover surface having one of a hidden arrangement and an exposed arrangement according to an angle of rotation between the first and second device units.

The foregoing and/or other features and utilities of the present inventive concept also provide an apparatus including a hinge assembly including a plurality of shaft members and a plurality of cover units mounted on the hinge assembly to cover the hinge assembly. Each of the cover units may include a cover surface to hide a side of the hinge assembly. The cover surface may include an auxiliary cover surface having one of a hidden arrangement and an exposed arrangement according to arrangement states of the shaft members.

The foregoing and/or other features and utilities of the present inventive concept also provide an apparatus including a hinge having a first shaft between first and second portions of the apparatus, a second shaft between the first shaft and the second portion, and configured to connect the first and second portions, and a cover mounted on the hinge and configured to hide the hinge regardless of an angle formed between the first and second portions.

The cover may include a first cover member configured to hide a first side of the hinge and a second cover member configured to hide a second side of the hinge regardless of the angle formed between the first and second portions.

The second cover member may include a first cover surface configured to continuously hide the second side of the hinge and a second cover surface configured to hide the second side of the hinge when the hinge is arranged along a curve.

The foregoing and/or other features and utilities of the present inventive concept also provide a cover of a hinge assembly including a first cover member having a first cover surface configured to hide a first side of the hinge assembly, a second cover member having a second cover surface configured to hide a second side of the hinge assembly regardless of an angle formed between first and second portions of the hinge assembly, and a shaft connection member attached to the first and second cover members and configured to be attached to a cover mount member of the hinge assembly.

The cover mount member may be configured to allow a shaft of the hinge assembly to pass through the cover mount member.

The shaft connection member may include a groove configured to facilitate an attachment of the second cover member to the shaft connection member.

The second cover member may include a rib configured to be inserted into the groove to facilitate the attachment of the second cover member to the shaft connection member.

The second cover member may include a main cover portion having a main cover surface, an auxiliary cover portion having an auxiliary cover surface, and the main cover surface and the auxiliary cover surface form the second cover surface.

The main cover portion and the auxiliary cover portion may be formed in a shape of a step.

The cover may include a first cover unit and a second cover unit. The main cover portion of the first cover unit may be configured to be disposed adjacent to the main cover portion of the second cover unit along a first dimension when the hinge assembly is arranged along a line. The auxiliary cover portion of the first cover unit may be configured to be disposed adjacent to the main cover portion of the second cover unit along a second dimension when the hinge assembly is arranged along the line.

The main cover surface may be configured to continuously hide the second side of the hinge assembly.

The auxiliary cover surface may be configured to hide the second side of the hinge assembly when the hinge assembly is arranged along a curve.

A distance between the shaft connection member and the main cover surface may be longer than a distance between the shaft connection member and the auxiliary cover surface.

BRIEF DESCRIPTION OF THE DRAWINGS

These and/or other features and utilities of the present general inventive concept will become apparent and more readily appreciated from the following description embodiments, taken in conjunction with the accompanying drawings of which.

DETAILED DESCRIPTION OF THE EMBODIMENTS

Figure 1:
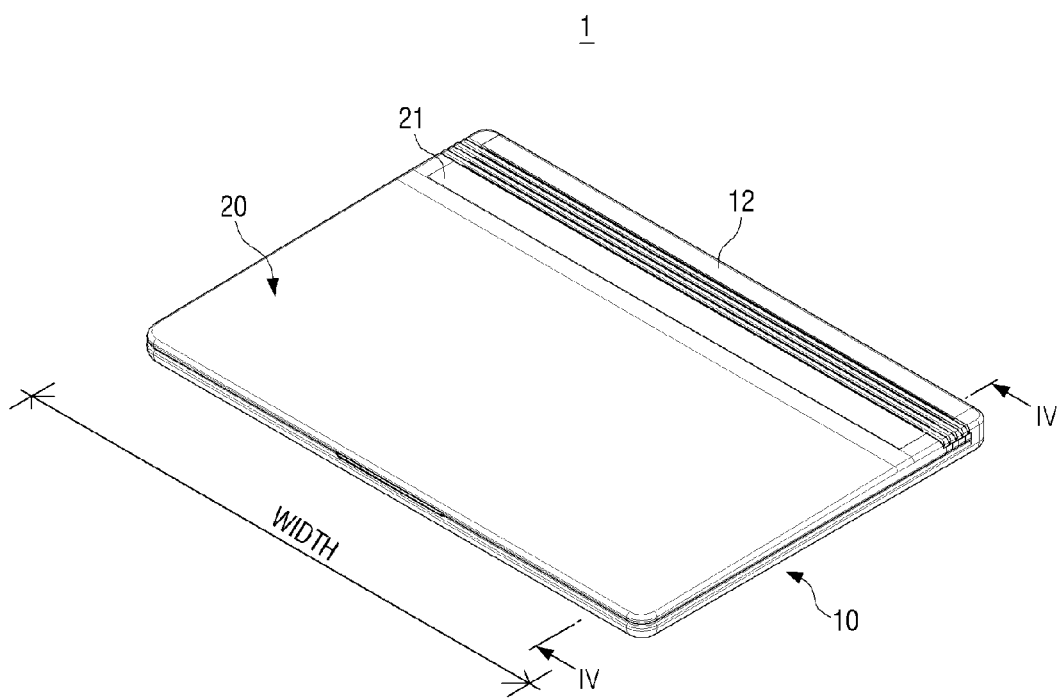
FIG. 1 is a perspective view illustrating an electronic apparatus in a folded state, according to an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
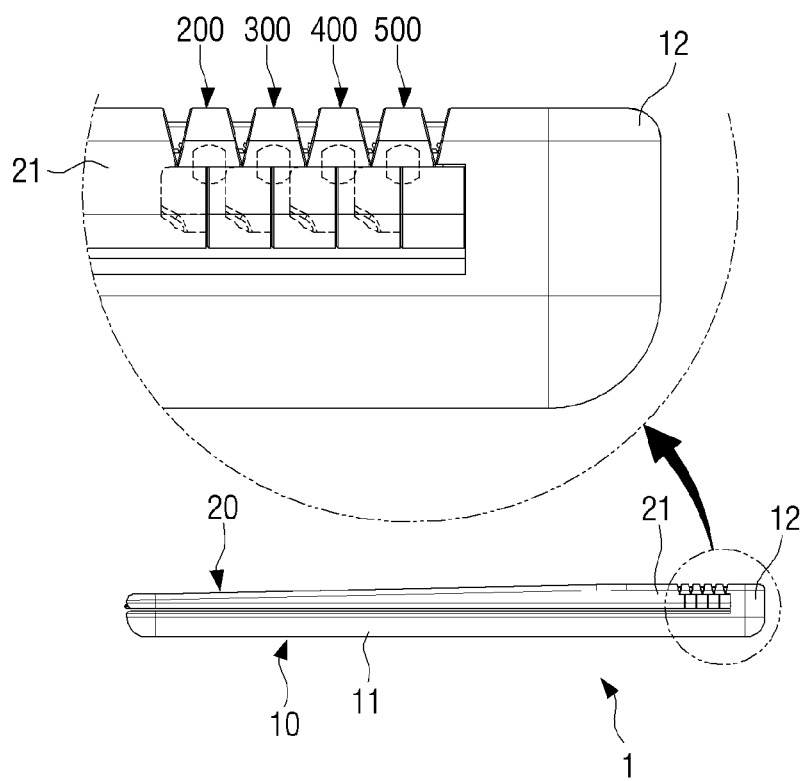
FIG. 2 is a side view of the electronic apparatus illustrated in FIG. 1.
Figure 3:
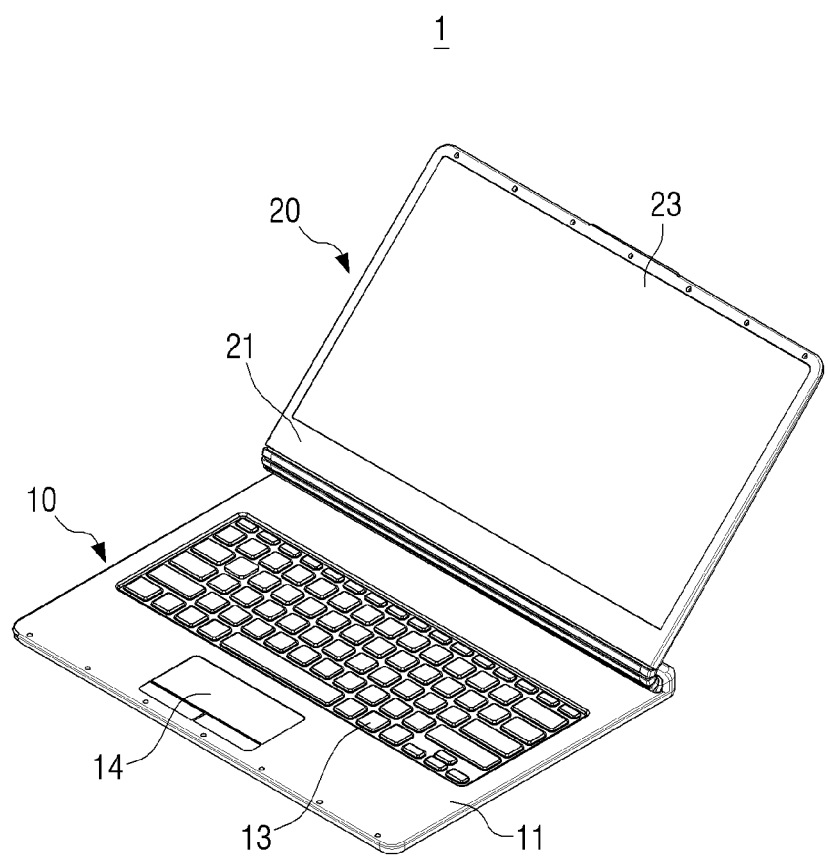
FIG. 3 is a perspective view of the electronic apparatus illustrated FIG. 1 in an unfolded state.
Figure 4:
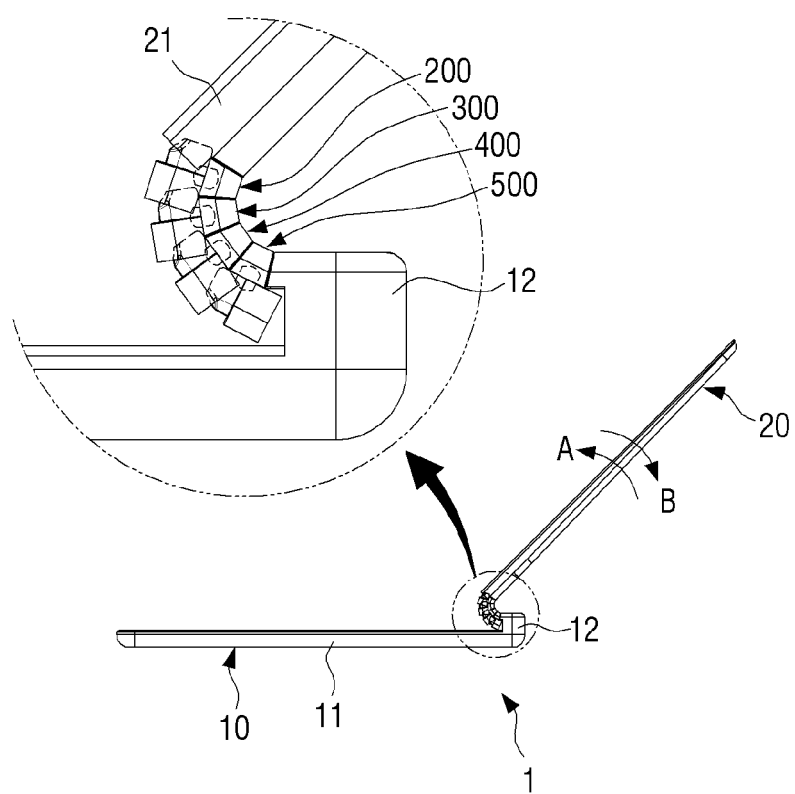
FIG. 4 is a side view of the electronic apparatus illustrated in FIG. 3.
Figure 5:
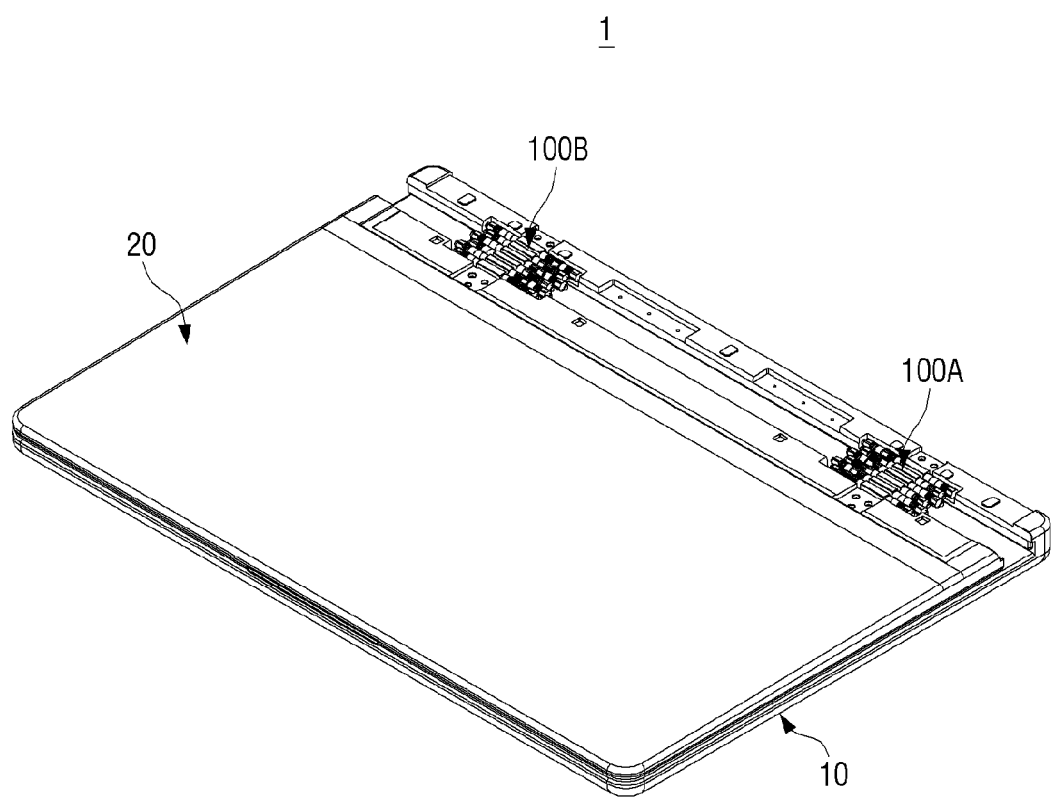
FIG. 5 is a perspective view of the electronic apparatus illustrated in FIG. 1 with a cover unit omitted.

FIG. 1 is a perspective view illustrating an electronic apparatus 1 in a folded state, according to an embodiment of the present inventive concept. FIG. 2 is a side view of the electronic apparatus 1 illustrated in FIG. 1. FIG. 3 is a perspective view of the electronic apparatus 1 illustrated in FIG. 1 in an unfolded state. FIG. 4 is a side view of the electronic apparatus 1 illustrated in FIG. 3. FIG. 5 is a perspective view of the electronic apparatus 1 illustrated in FIG. 1 with a cover unit omitted.

Referring to FIGS. 1 to 5, the electronic apparatus 1, according to an embodiment of the present inventive disclosure, may be exemplified as a laptop computer, but the present inventive concept is not limited to this configuration. The present inventive concept may also be applied to any other kind of electronic apparatus that has one or more device units that are pivotally mounted on a main body of the electronic apparatus.

Referring to FIGS. 1 to 5, the electronic apparatus 1 may include a first device unit 10 and a second device unit 20.

The first device unit 10 may be a portion that forms a main body portion of the electronic apparatus 1. A plurality of input keys 13 and a touchpad 14 may be provided on an upper surface of the first device unit 10. A controller (not illustrated) configured to control the operation of the electronic apparatus 1 may be built into the first device unit 10. The first device unit 10 may include a base portion 11 configured to be put on a table or a desk, and a hinge mount portion 12 configured to project upward from an upper end of the base portion 11.

The second device unit 20 may be a portion that forms a display portion of the electronic apparatus 1. A display screen 23 may be provided on an inner surface of the second device unit 20. In order to provide the display screen 23, a display panel, such as, for example, a Liquid Crystal Display (LCD) panel or an Organic Light-Emitting Diode (OLED) panel, may be provided on the second device unit 20.

Referring to FIG. 4, the second device unit 20 may be pivotal in a direction in which the second device unit 20 is folded to the first device unit 10 (A direction) and in a direction in which the second device unit 20 is unfolded from the first device unit 10 (B direction). Accordingly, the second device unit 20 may be arranged at various angles with respect to the first device unit 10. For example, as illustrated in FIGS. 1 and 2, the second device unit 20 may be completely folded to the first device unit 10, or, as illustrated in FIGS. 3 and 4, may be unfolded from the first device unit 10 to expose the display screen 23.

Referring to FIG. 5, the electronic apparatus 1 may further includes two hinge assemblies 100A and 100B that pivotally connect the second device unit 20 to the first device unit 10. Although in an embodiment of the present inventive disclosure, it may be exemplified that the electronic apparatus 1 uses the two hinge assemblies 100A and 100B, the present inventive concept is not limited to this configuration. Alternatively, the electronic apparatus 1 may use only one hinge assembly or may use three or more hinge assemblies.

In an embodiment of the present inventive concept, the structure of the first hinge assembly 100A may be completely the same as the structure of the second hinge assembly 100B. Accordingly, the structure of the first hinge assembly 100A is described as representative of each of the first and the second hinge assemblies 100A and 100B. The structure of the second hinge assembly 100B may be fully understood from the description of the first hinge assembly 100A.

Figure 6:
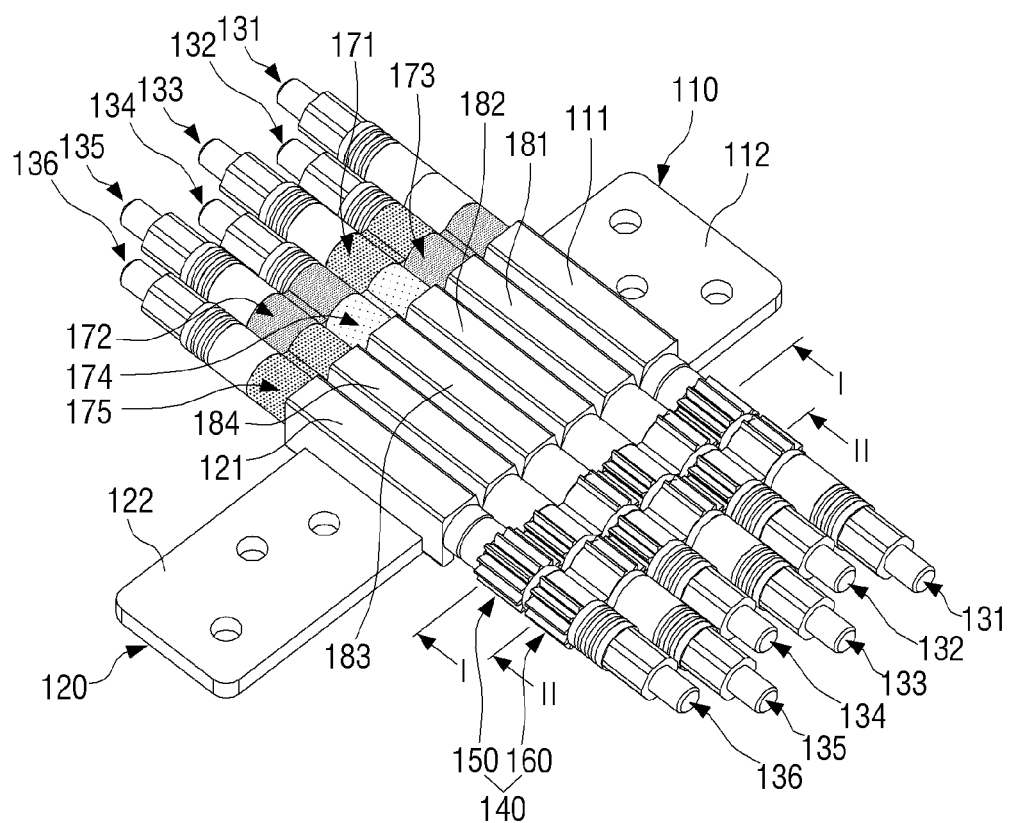
FIG. 6 is an enlarged perspective view of one of the hinge assemblies illustrated in FIG. 5.
Figure 7A:
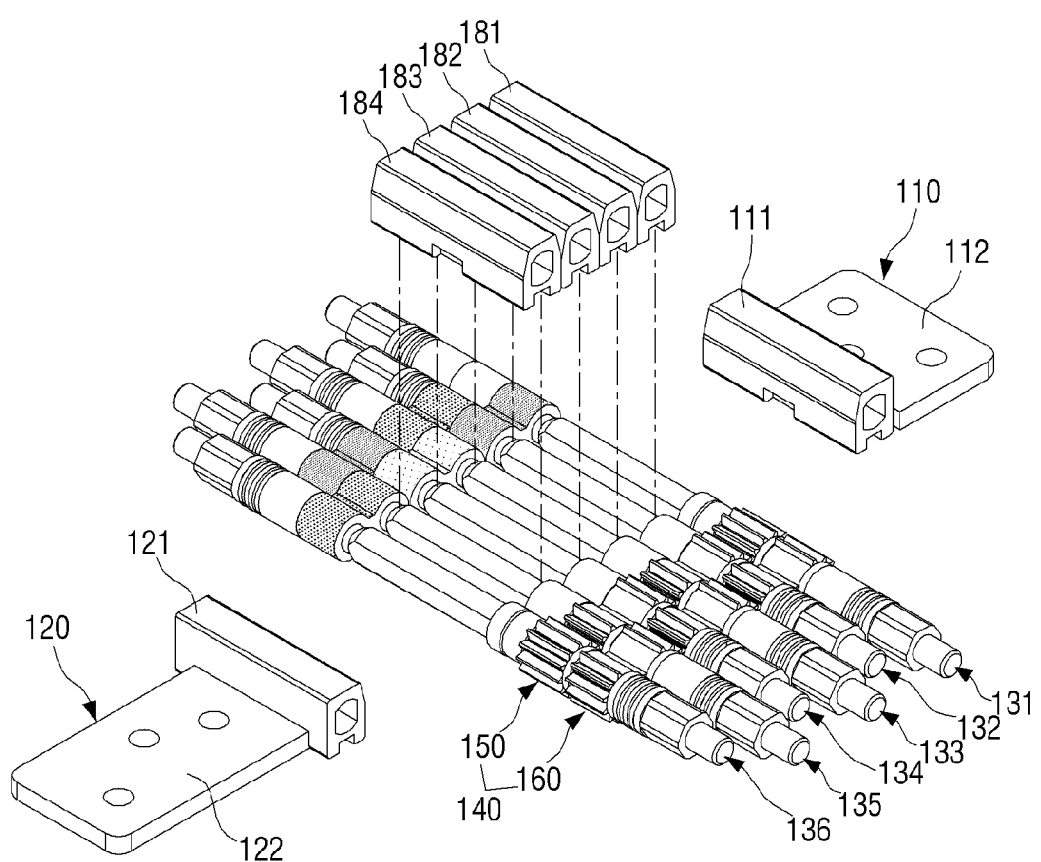
FIG. 7A is a partial exploded perspective view of the hinge assembly illustrated in FIG. 6.
Figure 7B:
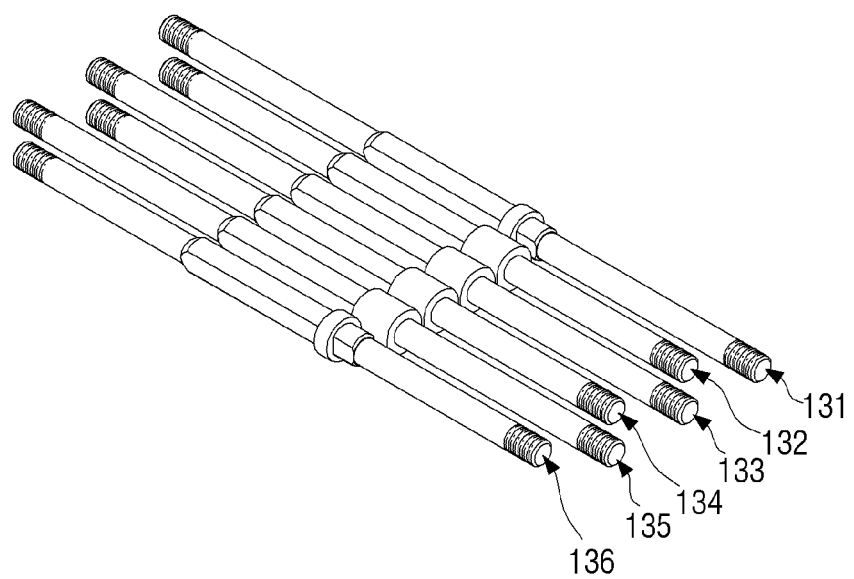
FIG. 7B is a perspective view of a plurality of shaft members provided in the hinge assembly illustrated in FIG. 6.

FIG. 6 is an enlarged perspective view of the hinge assembly 100A illustrated in FIG. 5. FIG. 7A is a partial exploded perspective view of the hinge assembly 100A illustrated in FIG. 6. FIG. 7B is a perspective view of a plurality of shaft members provided in the hinge assembly 100A illustrated in FIG. 6.

Referring to FIGS. 6, 7A, and 7B, the hinge assembly 100A may include, for example, first and second fixing units 110 and 120, a plurality of shaft members 131, 132, 133, 134, 135, and 136, a gear unit 140, and a plurality of coupler members 171, 172, 173, 174, and 175. Although in an embodiment of the present inventive concept, it may be exemplified that the hinge assembly 100A includes six shaft members and five coupler members, the present inventive concept is not limited to this configuration. Alternatively, the hinge assembly 100A may include more or fewer shaft members and/or coupler members.

The first fixing unit 110 may include a shaft connection member 111 and a hinge fixing plate 112. The shaft connection member 111 may be coupled to the shaft member 131 that may be arranged to pass through the shaft connection member 111, and the hinge fixing plate 112 may be coupled to a hinge mount portion 12 (see FIG. 2) of the first device unit 10 by screw members (not illustrated). Through coupling of the hinge fixing plate 112 to the first device unit 10, the hinge assembly 100A may be connected to the first device unit 10.

The second fixing unit 120 may include a shaft connection member 121 and a hinge fixing plate 122. The shaft connection member 121 may be coupled to the shaft member 136 that may be arranged to pass through the shaft connection member 121, and the hinge fixing plate 122 may be coupled to a lower end portion 21 (see FIG. 2) of the second device unit 20 by screw members (not illustrated). Through coupling of the hinge fixing plate 122 to the second device unit 20, the hinge assembly 100A may be connected to the second device unit 20.

The plurality of shaft members 131, 132, 133, 134, 135, and 136 may be arranged in parallel with each other, and a size of a gap between any two neighboring shaft members may be maintained constant. The plurality of shaft members 131, 132, 133, 134, 135, and 136 may be first and second outer shaft members 131 and 136 arranged on the outermost sides, and four inner shaft members 132, 133, 134, and 135 arranged between the two outer shaft members 131 and 136.

In an embodiment of the present inventive concept, the first outer shaft member 131 may be arranged to be hidden by the hinge mount portion 12 (see FIG. 2) of the first device unit 10, and the second outer shaft member 136 may be arranged to be hidden by the lower end portion 21 (see FIG. 2) of the second device unit 20. Accordingly, it may not be necessary to separately provide members to hide the first and second outer shaft members 131 and 136.

In contrast, in an embodiment of the present inventive concept, the four inner shaft members 132, 133, 134, and 135 may be arranged not to be hidden by the first and second device units 10 and 20. Thus, in order to prevent the inner shaft members 132, 133, 134, and 135 from being visible, it may be necessary to separately provide members to hide the inner shaft members 132, 133, 134, and 135. This is described in detail below.

One cover mount member may be coupled to a center portion of each of the inner shaft members 132, 133, 134, and 135. For example, a first cover mount member 181 may be coupled to the first inner shaft member 132, and a second cover mount member 182 may be coupled to the second inner shaft member 133. For example, a third cover mount member 183 may be coupled to the third inner shaft member 134, and a fourth cover mount member 184 may be coupled to the fourth inner shaft member 135. For example, structures of the first to the fourth cover mount members 181, 182, 183, and 184 may be the same.

Figure 8A:
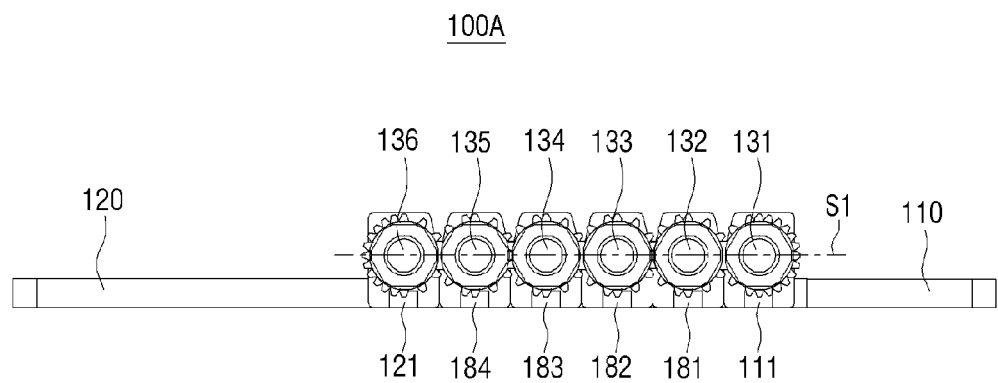
FIG. 8A is a side view of the hinge assembly illustrated in FIG. 6.
Figure 8B:
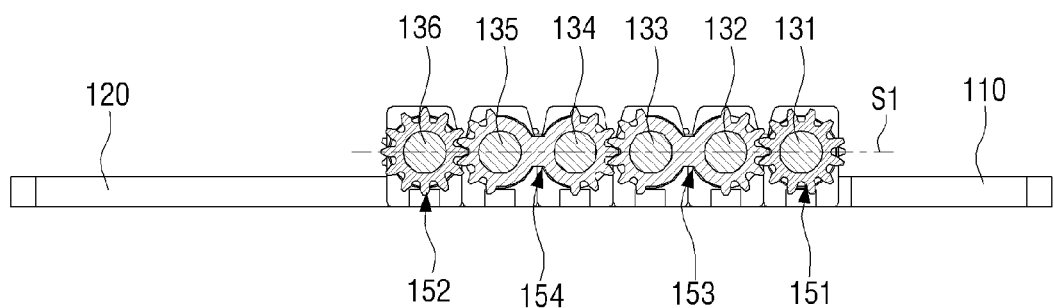
FIG. 8B is a cross-sectional view taken along line I-I illustrated in FIG. 6.
Figure 8C:
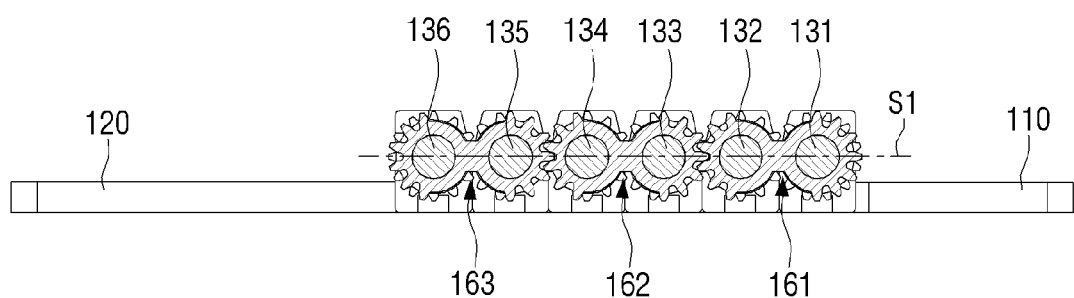
FIG. 8C is a cross-sectional view taken along line II-II illustrated in FIG. 6.

Referring to FIGS. 8B and 8C, to be described below together with FIG. 6, the gear unit 140 may include, for example, seven gear members 151, 152, 153, 154, 161, 162, and 163. Although in an embodiment of the present inventive concept, it may be exemplified that the gear unit 140 includes seven gear members, the present inventive concept is not limited to this configuration. Alternatively, the gear unit 140 may include more or fewer gear members.

The first and second gear member 151 and 152 may be provided as general spur gears, and may be coupled, respectively, to the first and second outer shaft members 131 and 136.

The other five gear members 153, 154, 161, 162, and 163 may be provided as coupling gears. For example, the third gear member 153 may be coupled to the first and second inner shaft members 132 and 133, and the fourth gear member 154 may be coupled to the third and fourth inner shaft members 134 and 135. The fifth gear member 161 may be coupled to the first outer shaft member 131 and the first inner shaft member 132, the sixth gear member 162 may be coupled to the second and third inner shaft members 133 and 134 and, the seventh gear member 163 may be coupled to the fourth inner shaft member 135 and the second outer shaft member 136.

For example, the first to fourth gear members 151, 152, 153, and 154 may be connected in series through gear engagement to form a first gear train 150, and the fifth to seventh gear members 161, 162, and 163 may be connected in series through gear engagement to form a second gear train 160. As illustrated in FIG. 6, the first gear train 150 and the second gear train 160 may be arranged in parallel to each other.

In response to a user applying a torque to perform a pivot operation to the second device unit 20, the torque may be transferred to the respective shaft members 131, 132, 133, 134, 135, and 136 through the gear members 151, 152, 153, 154, 161, 162, and 163, and thus the respective shaft members 131, 132, 133, 134, 135, and 136 may be pivoted with respect to other neighboring shaft members. Accordingly, the pivot operations of the respective shaft members 131, 132, 133, 134, 135, and 136 may be coupled to achieve the pivot operation of the second device unit 20. While the pivot operation of the second device unit 20 is performed, sizes of gaps between the shaft members 131, 132, 133, 134, 135, and 136 may be maintained constant by the five coupling gear members 153, 154, 161, 162, and 163.

The plurality of coupler members 171, 172, 173, 174, and 175, together with the five coupling gear members 153, 154, 161, 162, and 163, may serve to constantly maintain sizes of gaps between the shaft members 131, 132, 133, 134, 135, and 136. The five coupler members 171, 172, 173, 174, and 175 may be arranged to correspond to the five coupling gear members 153, 154, 161, 162, and 163.

For example, the first coupler member 171 may be coupled to the first and second inner shaft members 132 and 133, and the second coupler member 172 may be coupled to the third and fourth inner shaft members 134 and 135. The third coupler member 173 may be coupled to the first outer shaft member 131 and the first inner shaft member 132, and the fourth coupler member 174 may be coupled to the second and third inner shaft members 133 and 134. Further, the fifth coupler member 175 may be coupled to the fourth inner shaft member 135 and the second outer shaft member 136.

Figure 9A:
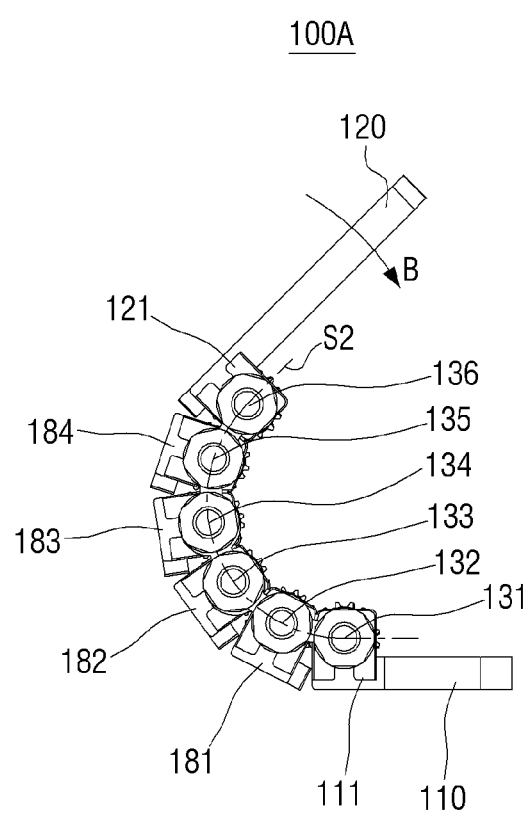
FIG. 9A is a side view of the hinge assembly illustrated in FIG. 8A, in a partly unfolded state.

FIG. 8A is a side view of the hinge assembly 100A illustrated in FIG. 6, FIG. 8B is a cross-sectional view taken along line I-I illustrated in FIG. 6, and FIG. 8C is a cross-sectional view taken along line II-II illustrated in FIG. 6. FIG. 9A is a side view of the hinge assembly 100A illustrated in FIG. 8A, in a partly unfolded state, FIG. 9B is a cross-sectional view illustrating the hinge assembly 100A illustrated in FIG. 8B, in a partly unfolded state, and FIG. 9C is a cross-sectional view illustrating the hinge assembly 100A illustrated in FIG. 8C, in a partly unfolded state.

As illustrated in FIGS. 8A, 8B, and 8C, in response to the second device unit 20 being folded to the first device unit 10, the plurality of shaft members 131, 132, 133, 134, 135, and 136 may be arranged along a plane surface 51 that is indicated by a dashed dotted line.

Figure 9B:
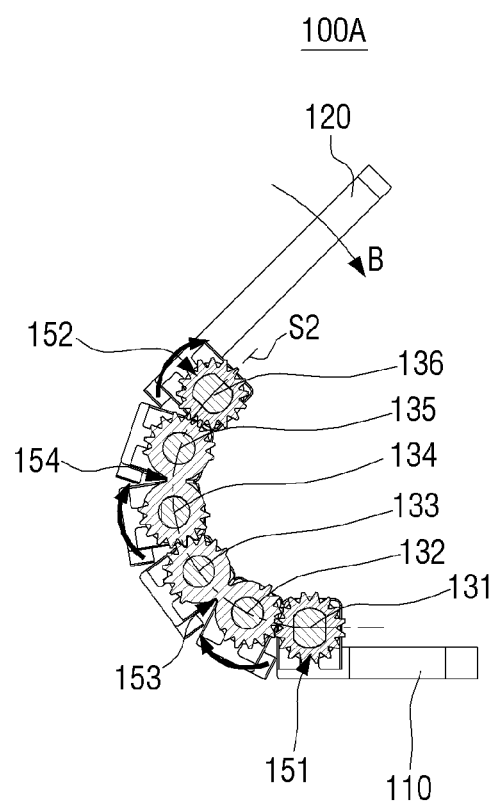
FIG. 9B is a cross-sectional view of the hinge assembly illustrated in FIG. 8B, in a partly unfolded state.
Figure 9C:
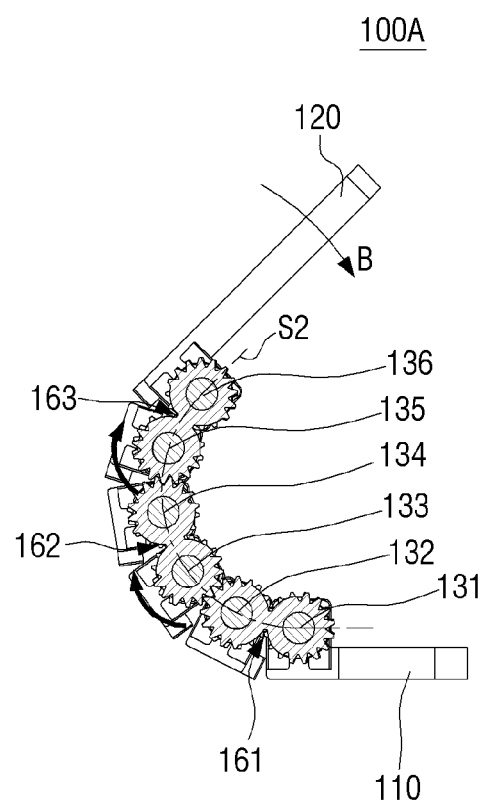
FIG. 9C is a cross-sectional view the hinge assembly illustrated in FIG. 8C, in a partly unfolded state.

As illustrated in FIGS. 9A, 9B, and 9C, in response to a user applying a torque to the second device unit 20 in the B direction, the torque may be transferred to the respective shaft members 131, 132, 133, 134, 135, and 136 through the gear members 151, 152, 153, 154, 161, 162, and 163, and thus the respective shaft members 131, 132, 133, 134, 135, and 136 may perform relative pivot operations. Accordingly, such pivot operations may be coupled to achieve the pivot operation of the second device unit 20. Through this pivot operation, the second device unit 20 may be arranged to be partly unfolded from the first device unit 10 so that the plurality of shaft members 131, 132, 133, 134, 135, and 136 may be arranged along a curved surface S2 that is indicated by a dashed dotted line.

As illustrated in FIGS. 2 and 4, the electronic apparatus 1 may include a plurality of cover units 200, 300, 400, and 500 to hide a gap space formed between the first device unit 10 and the second device unit 20 in order to install the first and second hinge assemblies 100A and 100B as described above. Through use of the cover units 200, 300, 400, and 500, not only the gap space between the first device unit 10 and the second device unit 20, but also the first and second hinge assemblies 100A and 100B that may be arranged in the gap space may be hidden so that they are not visible.

Figure 10:
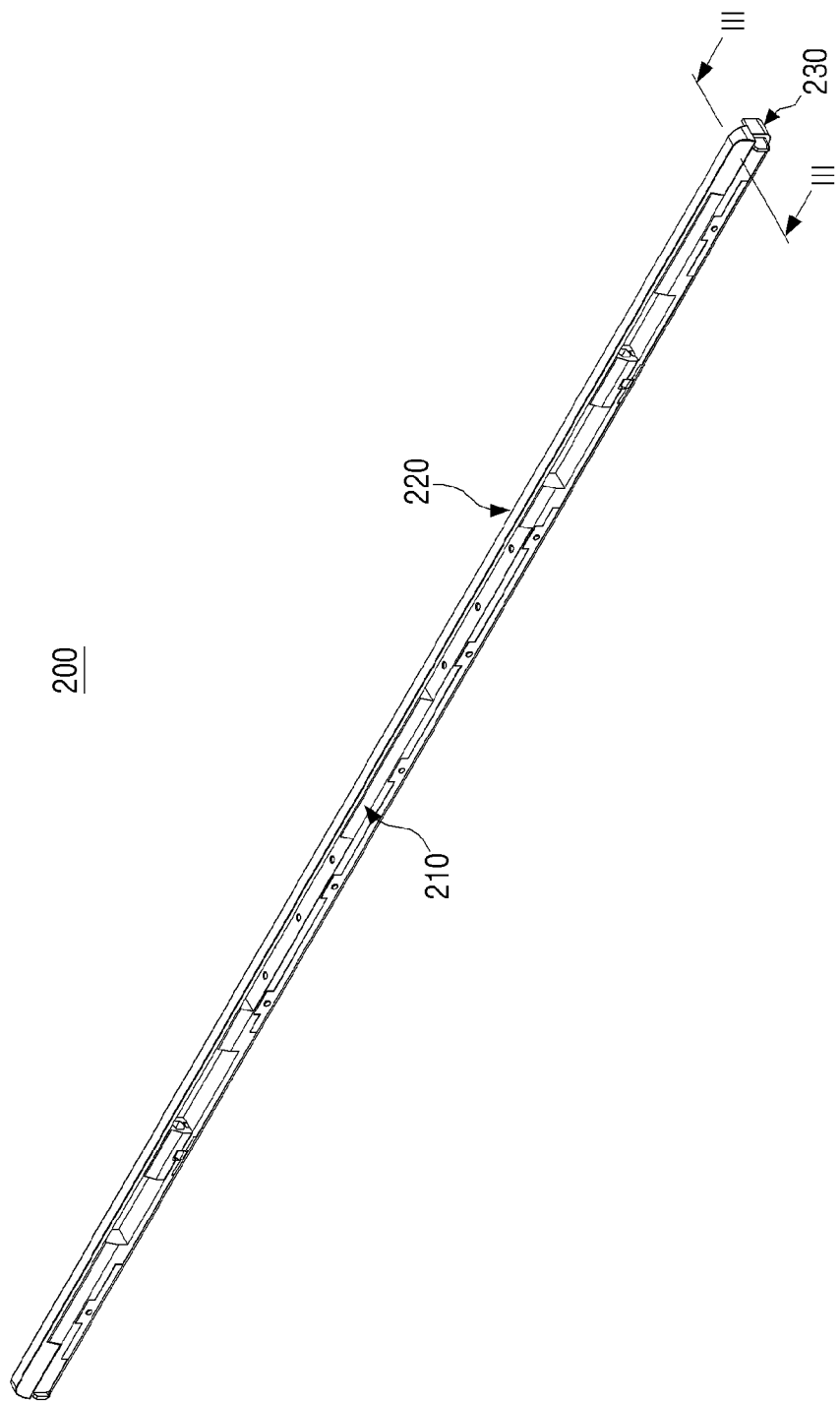
FIG. 10 is a perspective view of a cover unit to cover the hinge assemblies illustrated in FIG. 5.

In an embodiment of the present inventive concept, the cover units 200, 300, 400, and 500 may have the same structure. Accordingly, the structure of the first cover unit 200 is described, with reference to FIGS. 10 and 11, as representative of each of the cover units 200, 300, 400, and 500. FIG. 10 is a perspective view of the cover unit 200 to cover the hinge assemblies 100A and 100B illustrated in FIG. 5, FIG. 11 is an exploded perspective view of the cover unit 200 illustrated in FIG. 10, and FIG. 12 is an enlarged cross-sectional view of the cover unit 200 illustrated in FIG. 10 taken along line III-Ill illustrated in FIG. 10.

Figure 11:
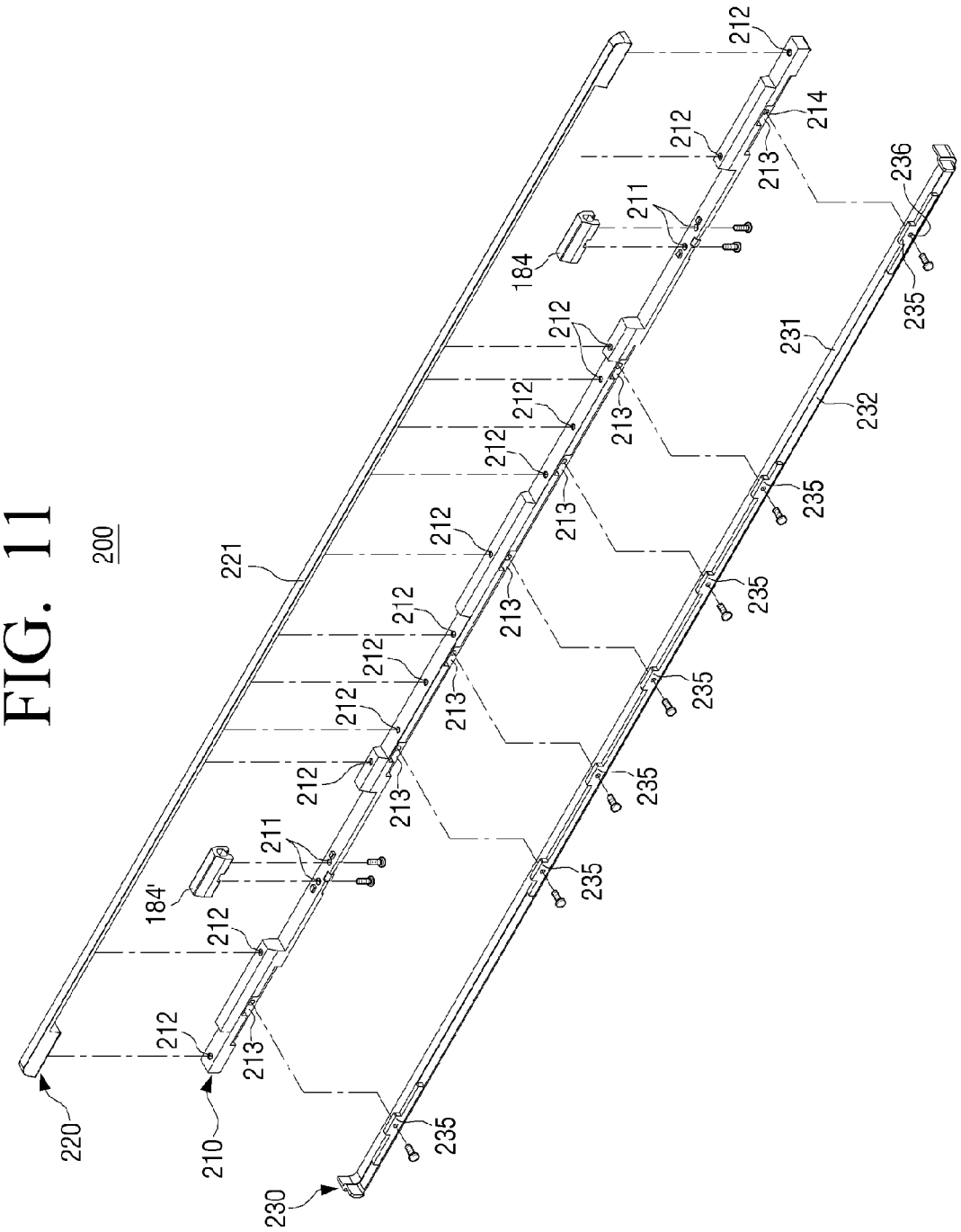
FIG. 11 is an exploded perspective view of the cover unit illustrated in FIG. 10.
Figure 12:
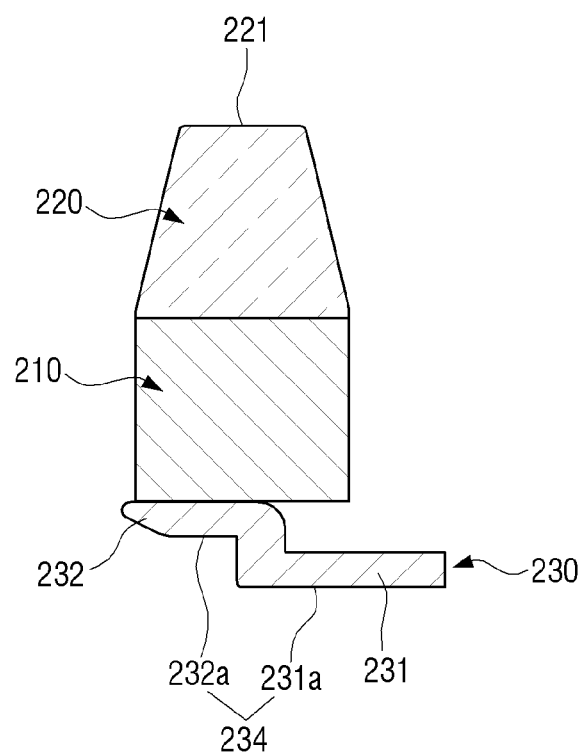
FIG. 12 is an enlarged cross-sectional view of the cover unit illustrated in FIG. 10 taken along line III-III illustrated in FIG. 10.

Referring to FIGS. 10 to 12, the cover unit 200 may include a shaft connection member 210, a first cover member 220, and a second cover member 230.

The fourth cover mount member 184 illustrated in FIG. 11 may be mounted on the fourth inner shaft member 135 of the first hinge assembly 100A (see FIG. 7A), and the other fourth cover mount member 184' illustrated in FIG. 11 may be mounted on the fourth inner shaft member (not illustrated) of the second hinge assembly 100B (see FIG. 5).

The shaft connection member 210 may be, for example, screw-fastened to the pair of fourth cover mount members 184 and 184', and may be connected to the fourth inner shaft member 135 of the first hinge assembly 100A that corresponds to the fourth cover mount member 184 and to the fourth inner shaft member (not illustrated) of the second hinge assembly 100B that corresponds to the fourth cover mount member 184'. In order to fasten screws to the fourth cover mount members 184 and 184', four screw fastening holes 211 may be formed on the shaft connection member 210.

In an embodiment of the present inventive concept, the shaft connection member 210 may be coupled to two shaft members, but the present inventive concept is not limited to this configuration. The number of shaft members that may be coupled to the shaft connection member 210 may be determined, for example, depending on the number of hinge assemblies used in the electronic apparatus 1. For example, if one hinge assembly is used in the electronic apparatus 1, the shaft connection member 210 may be coupled to one corresponding shaft member. Alternatively, for example, if three different hinge assemblies are used in the electronic apparatus 1, the shaft connection member 210 may be coupled to three corresponding shaft members.

The shaft connection member 210 as described above may extend along the width direction of the electronic apparatus 1 (see FIG. 1), and the length of the shaft connection member 210 may substantially correspond to the width of the electronic apparatus 1. A plurality of coupling holes 212, for example, to couple to the first cover member 220 may be formed on an upper side of the shaft connection member 210. Furthermore, a plurality of coupling grooves 213, for example, to couple to the second cover member 230 may be formed on a lower side of the shaft connection member 210, and screw holes 214, for example, may be formed in the respective coupling grooves 213.

The first cover member 220 may be arranged on the upper side of the shaft connection member 210. On a bottom surface of the first cover member 220, a plurality of coupling projections (not illustrated), which may be inserted into the coupling holes 212 of the shaft connection member 210 and may be shaped to correspond to the coupling holes 212, may be formed. Because the plurality of coupling projections may be inserted into the coupling holes 212, the first cover member 220 may be coupled to the shaft connection member 210. In order to secure the coupling between the first cover member 220 and the shaft connection member 210, adhesives may additionally be provided between the shaft connection member 210 and the first cover member 220.

The first cover member 220 may extend along the width direction of the electronic apparatus 1 (see FIG. 1), and the length of the first cover member 220 may correspond to the length of the shaft connection member 210. The first cover member 220 may have a first cover surface 221 that hides the upper sides of the first and second hinge assemblies 100A and 100B.

The second cover member 230 may include a main cover portion 231 and an auxiliary cover portion 232. The main cover portion 231 and the auxiliary cover portion 232 may extend along the width direction of the electronic apparatus 1 (see FIG. 1), and their lengths may correspond to the length of the shaft connection member 210.

Referring to FIG. 12, the main cover portion 231 and the auxiliary cover portion 232 may be formed in a shape of a step and may include a main cover surface 231a and an auxiliary cover surface 232a. Together the main cover surface 231a and the auxiliary cover surface 232a may form a second cover surface 234 of the first cover unit 200. For example, the main cover surface 231a of the second cover surface 234 may continuously hide the lower sides of the first and second hinge assemblies 100A and 100B regardless of the pivot angle of the first device unit 10 whereas the auxiliary cover surface 232a of the second cover surface 234 may assist in hiding the lower sides of the first and second hinge assemblies 100A and 100B only when the electronic apparatus 1 is unfolded.

As illustrated in FIG. 12, the second cover member 230 may be arranged on the lower side of the shaft connection member 210. The distance between the shaft connection member 210 and the main cover surface 231a may be longer than the distance between the shaft connection member 210 and the auxiliary cover surface 232a. In the same manner, one of skill in the art understands that the distance between the main cover portion 231 and the corresponding fourth inner shaft member 135 may be longer than the distance between the auxiliary cover portion 232 and the corresponding fourth inner shaft member 135.

Referring to FIG. 11, a plurality of coupling ribs 235, for example, that vertically project from the auxiliary cover portion 232 may be formed on the second cover member 230, and screw holes 236, for example, may be formed on the respective coupling ribs 235. The plurality of coupling ribs 235 may be inserted into the plurality of coupling grooves 213 of the shaft connection member 210 and may be fastened to the shaft connection member 210 through a plurality of screw members.

Figure 13:
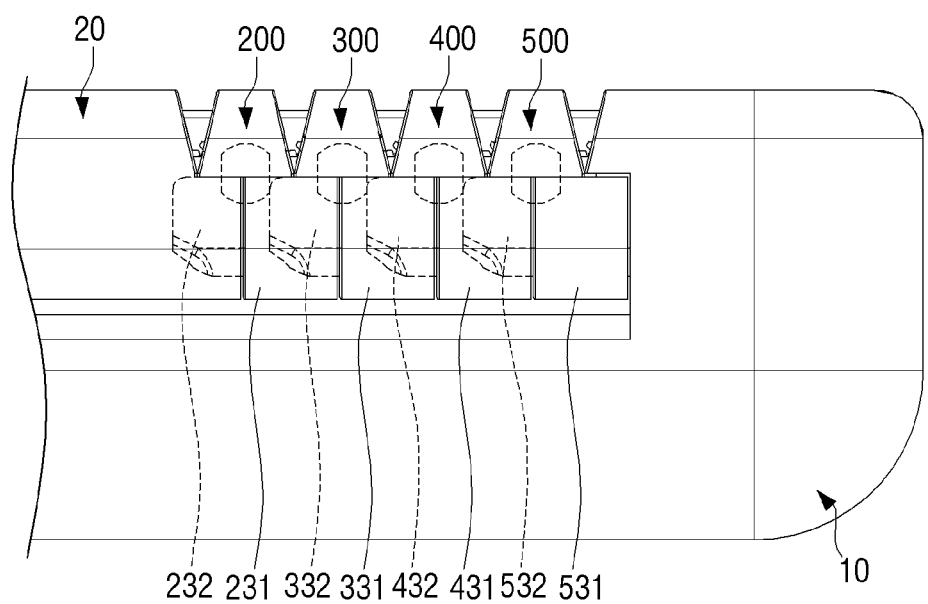
FIG. 13 is a side view illustrating the plurality of cover units disposed in the electronic apparatus illustrated in FIG. 1 in a folded state.
Figure 14:
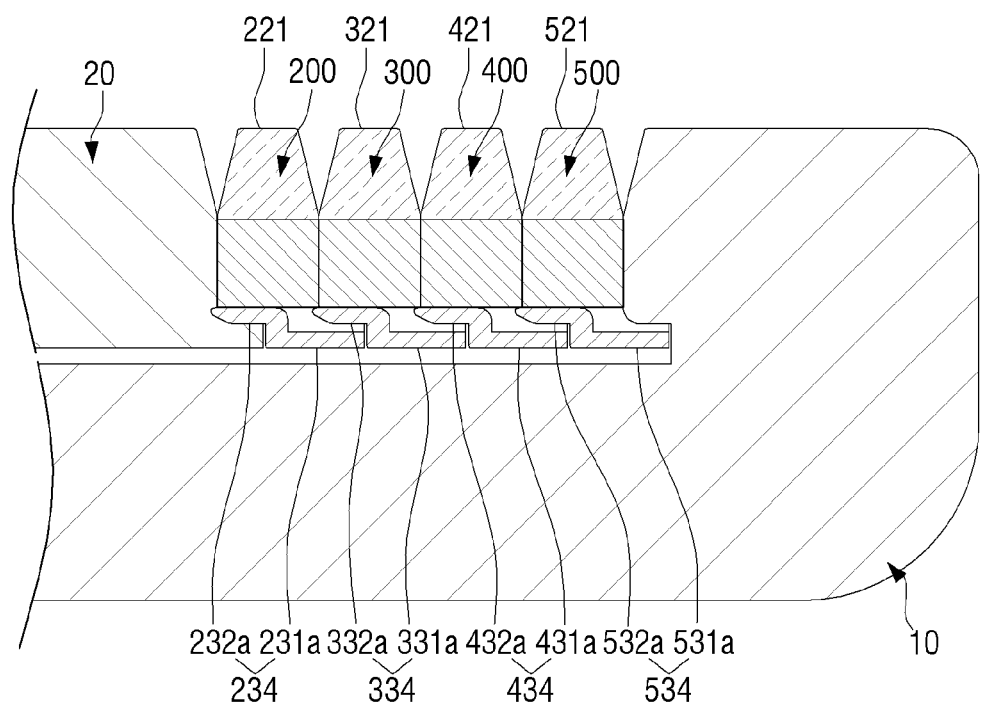
FIG. 14 is a partial cross-sectional view taken along line IV-IV illustrated in FIG. 1 that corresponds to the side view illustrated in FIG. 13.
Figure 15:
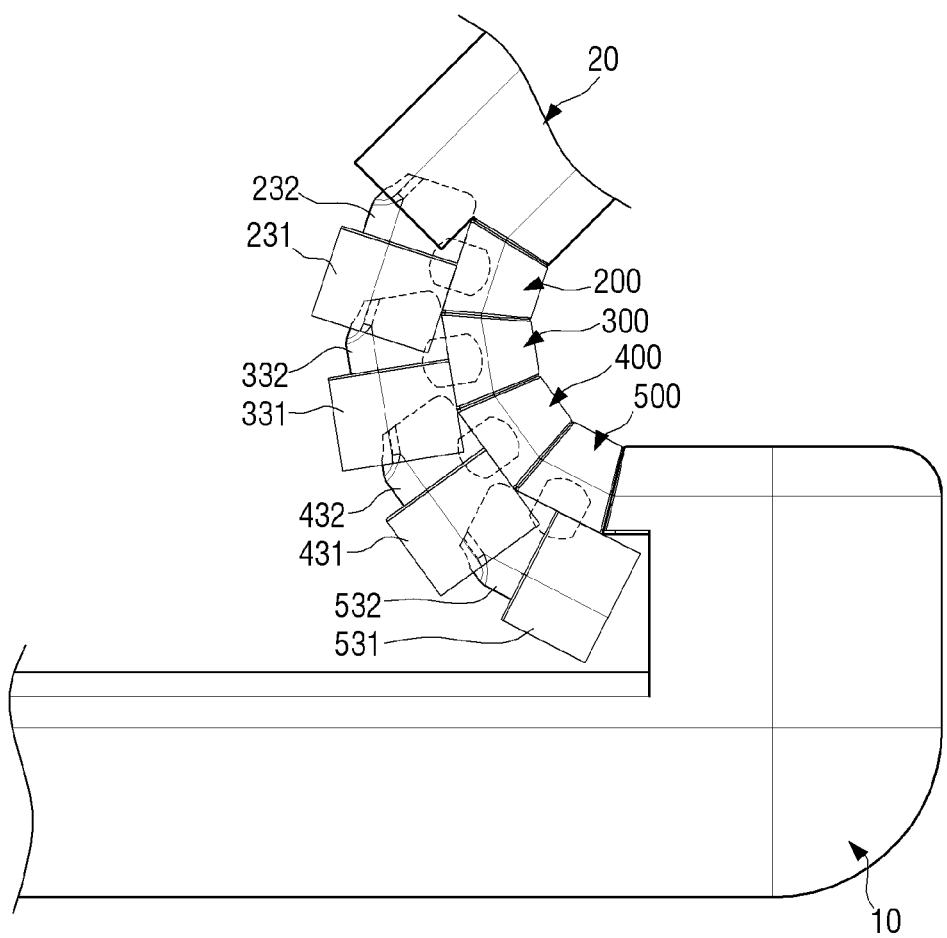
FIG. 15 is a side view illustrating the plurality of cover units disposed in the electronic apparatus illustrated in FIG. 1 in an unfolded state.
Figure 16:
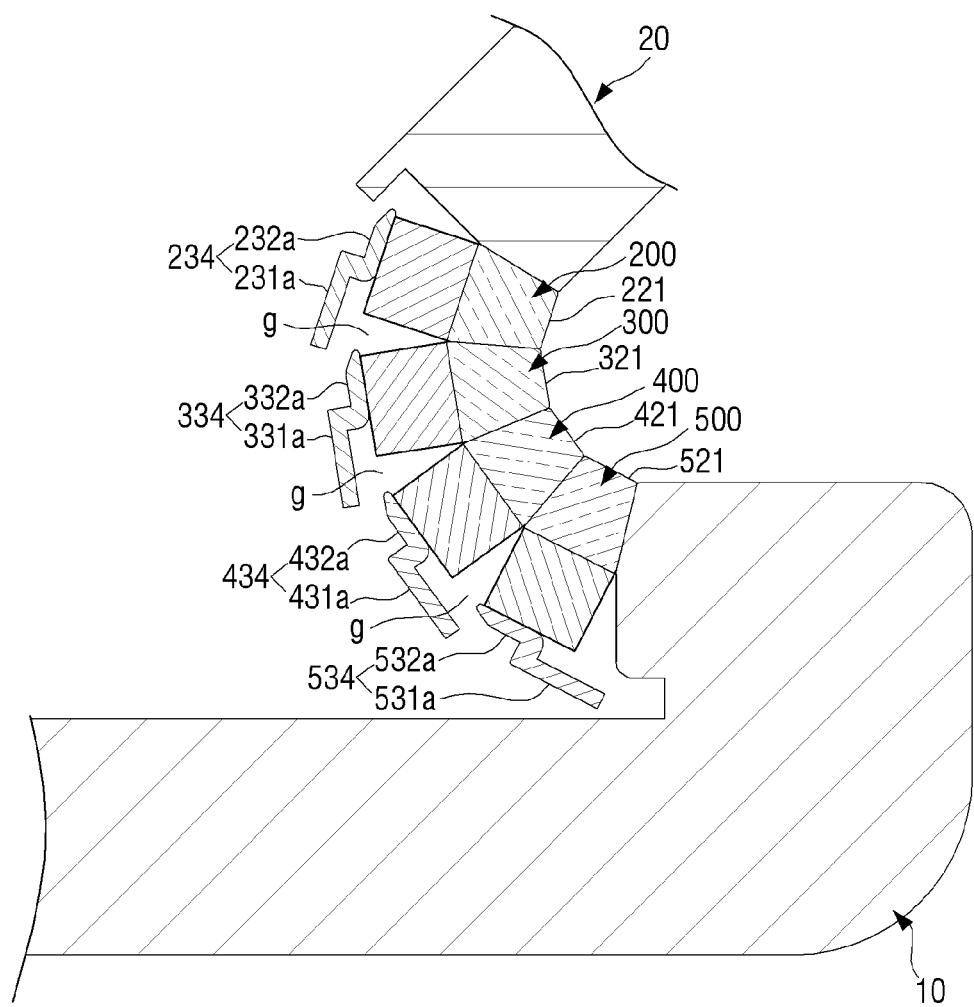
FIG. 16 is a partial cross-sectional view that corresponds to the side view illustrated in FIG. 13.

FIG. 13 is a side view illustrating the plurality of cover units disposed in the electronic apparatus 1 illustrated in FIG. 1 in a folded state, and FIG. 14 is a partial cross-sectional view taken along line IV-IV illustrated in FIG. 1 that corresponds to the side view illustrated in FIG. 13. FIG. 15 is a side view illustrating the plurality of cover units disposed in the electronic apparatus 1 illustrated in FIG. 1 in an unfolded state, and FIG. 16 is a partial cross-sectional view that corresponds to the side view illustrated in FIG. 13.

Although the structures of the second, third, and fourth cover units 300, 400, and 500 may be the same as the structure of the first cover unit 200, the second, third, and fourth cover units 300, 400, and 500 are briefly described with reference to FIGS. 13 to 16.

The second cover unit 300 may include a first cover surface 321 and a second cover surface 334, and the second cover surface 334 may include a main cover surface 331a of a main cover portion 331 and an auxiliary cover surface 332a of an auxiliary cover portion 332. Furthermore, the third cover unit 400 may include a first cover surface 421 and a second cover surface 434, and the second cover surface 434 may include a main cover surface 431a of a main cover portion 431 and an auxiliary cover surface 432a of an auxiliary cover portion 432. Furthermore, the fourth cover unit 500 may include a first cover surface 521 and a second cover surface 534, and the second cover surface 534 may include a main cover surface 531a of a main cover portion 531 and an auxiliary cover surface 532a of an auxiliary cover portion 532.

Referring to FIGS. 13 and 14, a situation in which the electronic apparatus 1 is folded is described.

In response to the electronic apparatus 1 being folded, as illustrated in FIG. 8A, the plurality of shaft members 131, 132, 133, 134, 135, and 136 of the respective first and second hinge assemblies 100A and 100B may be arranged along one common plane surface S1 (see FIGS. 8A to 8C). In this situation, the upper sides of the first and second hinge assemblies 100A and 100B may be hidden by the first cover surfaces 221, 321, 421, and 521. The lower sides of the first and second hinge assemblies 100A and 100B may be hidden by the main cover surfaces 231a, 331a, 431a, and 531a of, respectively, the second cover surfaces 234, 334, 434, and 534.

In this situation, as is illustrated in FIG. 14, the auxiliary cover surfaces 232a, 332a, 432a, and 532a of, respectively, the second cover surfaces 234, 334, 434, and 534 may not be exposed to an outside, but may be maintained in a hidden arrangement. For example, if the electronic apparatus 1 is folded, one of skill in the art understands that the auxiliary cover surfaces 232a, 332a, 432a, and 532a may not substantially contribute to the hiding of the lower sides of the first and second hinge assemblies 100A and 100B.

Referring to FIGS. 15 and 16, a situation in which the electronic apparatus 1 is unfolded is described.

As illustrated in FIG. 9A, in response to the plurality of shaft members 131, 132, 133, 134, 135, and 136 of the respective first and second hinge assemblies 100A and 100B being arranged along one common curved surface S2, the electronic apparatus 1 may be in a partly unfolded state as illustrated in FIGS. 15 and 16.

In this situation, the upper sides of the first and second hinge assemblies 100A and 100B may still be hidden by the first cover surfaces 221, 321, 421, and 521 of, respectively, the cover units 200, 300, 400, and 500.

The lower sides of the first and second hinge assemblies 100A and 100B may be hidden by the second cover surfaces 234, 334, 434, and 534 of, respectively, the cover units 200, 300, 400, and 500. For example, the lower sides of the first and second hinge assemblies 100A and 100B may be hidden by the main cover surfaces 231a, 331a, 431a, and 531a and the corresponding auxiliary cover surfaces 232a, 332a, 432a, and 532a that together may constitute, respectively, the second cover surfaces 234, 334, 434, and 534.

As illustrated in FIG. 16, in response to the electronic apparatus 1 being in a partly unfolded state, gaps g may be present between the cover units 200, 300, 400, and 500. However, referring to FIG. 16, one of skill in the art understands that the gaps g may be hidden by the main cover surfaces 231a, 331a, 431a, and 531a provided, respectively, in the cover units 200, 300, 400, and 500.

As illustrated in FIG. 16, in response to the electronic apparatus 1 being in an unfolded state, the main cover surfaces 231a, 331a, 431a, and 531a may be spaced apart from each other. For example, the gap spaces may be present between the main cover surfaces 231a, 331a, 431a, and 531a.

However, in response to the electronic apparatus 1 being in an unfolded state, the auxiliary cover surfaces 232a, 332a, 432a, and 532a may be arranged in the gap spaces between the main cover surfaces 231a, 331a, 431a, and 531a, and thus the respective cover units 200, 300, 400, and 500 may be prevented from being seen as being spaced apart from each other due to the gap spaces.

In an alternative embodiment of the present inventive concept, if the auxiliary cover surfaces 232a, 332a, 432a, and 532a are not provided in the respective cover units 200, 300, 400, and 500, it may not be possible for only the respective main cover surfaces 231a, 331a, 431a, and 531a to completely hide the lower sides of the first and second hinge assemblies 100A and 100B when the electronic apparatus 1 is in an unfolded state. This situation may detract from the beauty of the design of the electronic apparatus 1. Additionally, this situation may allow for foreign object debris to enter into a space of the first and second hinge assemblies 100A and 100B, which may interfere with an operation of the first and second hinge assemblies 100A and 100B.

However, according to this alternative embodiment or the present inventive concept, in response to the electronic apparatus 1 being shifted from a folded state to an unfolded state, the auxiliary cover surfaces 232a, 332a, 432a, and 532a, which may be shifted from a hidden arrangement to an exposed arrangement, may cover one side of the gap space between the first device unit 10 and the second device unit 20 together with the main cover surfaces 231a, 331a, 431a, and 531a, and thus the gap space between the first device unit 10 and the second device unit 20 may be completely hidden as the gaps g between the cover units 200, 300, 400, and 500 may not be visible. Accordingly, in comparison with the configuration in which the second cover surfaces 234, 334, 434, and 534 of the cover units 200, 300, 400, and 500 are composed of only the main cover surfaces 231a, 331a, 431a, and 531a, the beauty of the design of the electronic apparatus 1 according to this alternative embodiment of the present inventive concept may be further improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
   first and second device units;
   at least one hinge assembly configured to pivotally connect the second device unit to the first device unit and including a plurality of shaft members; and
   a plurality of cover units mounted on the at least one hinge assembly to hide the at least one hinge assembly,
   wherein each of the cover units includes a first cover member to hide a first side of the at least one hinge assembly and a second cover member to hide a second side of the at least one hinge assembly, and
   a second cover member of each of the cover units is partially overlapped with an adjacent second cover member while the first and second device unit are folded, and a relative position of second cover members is changed according to an angle at which the first and second device units are unfolded.

2. The electronic apparatus as claimed in claim 1, wherein the plurality of shaft members are changed in their arrangements according to an angle of rotation between the first and second device units.

3. The electronic apparatus as claimed in claim 2, wherein the second cover member comprises:
a main cover surface; and
an auxiliary cover surface formed extending from the main cover surface,
wherein the auxiliary cover surface has a hidden arrangement when the shaft members are arranged along a plane surface, and has an exposed arrangement when the shaft members are arranged along a curved surface.

4. The electronic apparatus as claimed in claim 3, wherein the shaft members are arranged along the plane surface when the electronic apparatus is in an unfolded state, and are arranged along the curved surface when the electronic apparatus is a folded state.

5. The electronic apparatus as claimed in claim 3, wherein when the auxiliary cover surface has the exposed arrangement, a gap between two of the cover units is hidden by the main cover surface.

6. The electronic apparatus as claimed in claim 3, wherein when the auxiliary cover surface has the exposed arrangement, a gap space between two of the main cover surfaces is hidden by the auxiliary cover surface.

7. The electronic apparatus as claimed in claim 1, further comprising a gear unit mounted on the shaft members to connect the plurality of shaft members through gear engagement.

8. The electronic apparatus as claimed in claim 7, wherein the gear unit comprises a first gear train and a second gear train arranged in parallel with each other, and each of the first and second gear trains includes a plurality of gear members connected in series to each other.

9. The electronic apparatus as claimed in claim 8, wherein each of the first and second gear trains comprises at least one coupling gear member configured to constantly maintain a gap between the plurality of shaft members.

10. The electronic apparatus as claimed in claim 1, wherein the at least one hinge assembly comprises two hinge assemblies having the same structure.

11. The electronic apparatus as claimed in claim 1, wherein the first device unit is a main body portion of the electronic apparatus, and the second device unit is a display portion of the electronic apparatus, the display portion having a display screen.

12. An electronic apparatus, comprising:
first and second device units;
at least one hinge assembly configured to pivotally connect the second device unit to the first device unit and including a plurality of shaft members; and
a plurality of cover units mounted on the at least one hinge assembly to hide the at least one hinge assembly,
wherein each of the cover units includes a first cover member to hide a first side of the at least one hinge assembly and a second cover member to hide a second side of the at least one hinge assembly, and
a second cover member of each of the cover units is partially overlapped with an adjacent second cover member while the first and second device units are folded, and a relative position of second cover members is changed according to an angle at which the first and second device units are unfolded,
wherein each of the cover units further comprises:
a shaft connection member connected to at least one corresponding shaft member of the plurality of shaft members,
wherein the first cover member coupled to the shaft connection member so as to be arranged on an upper side of the shaft connection member; and
wherein the second cover member coupled to the shaft connection member so as to be arranged on a lower side of the shaft connection member.

13. The electronic apparatus as claimed in claim 12, wherein the second cover member comprises:
a main cover portion; and
an auxiliary cover portion formed extending from the main cover portion.

14. The electronic apparatus as claimed in claim 13, wherein the main cover portion and the auxiliary cover portion form a shape of a step.

15. The electronic apparatus as claimed in claim 13, wherein a distance between the shaft members and the main cover portion is longer than a distance between the shaft members and the auxiliary cover portion.

16. An electronic apparatus, comprising:
first and second device units;
at least one hinge assembly configured to pivotally connect the second device unit to the first device unit and including a plurality of shaft members; and
a plurality of cover units mounted on the at least one hinge assembly to hide the at least one hinge assembly,
wherein each of the cover units includes a first cover member to hide a first side of the at least one hinge assembly and a second cover member to hide a second side of the at least one hinge assembly,
a second cover member of each of the cover units is partially overlapped with an adjacent second cover member while the first and second device units are folded, and a relative position of second cover members is changed according to an angle at which the first and second device units are unfolded; and
a plurality of coupler members configured to constantly maintain a gap between the plurality of shaft members.

17. An electronic apparatus, comprising:
a first device unit and a second device unit;
a hinge assembly configured to rotatably connect the second device unit to the first device unit and including a plurality of shaft members; and
a plurality of cover units mounted on the hinge assembly to cover the hinge assembly,
wherein each of the cover units includes a first cover member configured to hide a first side of the hinge assembly and a second cover member configured to hide a second side of the hinge assembly regardless of an angle formed between first and second portions, and
wherein a cover surface of the second cover member includes an auxiliary cover surface having one of a hidden arrangement and an exposed arrangement according to an angle of rotation between the first and second device units.

18. An apparatus, comprising:
a hinge assembly including a plurality of shaft members; and
a plurality of cover units mounted on the hinge assembly to cover the hinge assembly,
wherein each of the cover units includes a first cover member configured to hide a first side of the hinge assembly and a second cover member configured to hide a second side of the hinge assembly regardless of an angle formed between first and second portions, and
wherein a cover surface of the second cover member includes an auxiliary cover surface having one of a hidden arrangement and an exposed arrangement according to arrangement states of the shaft members.

19. An apparatus, comprising:
a hinge having a first shaft between first and second portions of the apparatus, a second shaft between the first shaft and the second portion, and configured to connect the first and second portions; and
a cover mounted on the hinge and configured to hide the hinge regardless of an angle formed between the first and second portions,
wherein the cover includes a first cover member configured to hide a first side of the hinge and a second cover member configured to hide a second side of the hinge regardless of an angle formed between first and second portions, and
wherein the second cover member includes a first cover surface configured to continuously hide the second side of the hinge and a second cover surface configured to hide the second side of the hinge when the hinge is arranged along a curve.

* * * * *